(12) United States Patent
Andrews

(10) Patent No.: US 8,539,657 B2
(45) Date of Patent: Sep. 24, 2013

(54) CAPTIVE SCREW DEVICE AND METHOD

(75) Inventor: Paul David Andrews, Fredericktown, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 218 days.

(21) Appl. No.: 13/104,308

(22) Filed: May 10, 2011

(65) Prior Publication Data

US 2012/0284995 A1 Nov. 15, 2012

(51) Int. Cl.
*B25B 27/14* (2006.01)

(52) U.S. Cl.
USPC ............ 29/270; 269/6; 269/3; 29/255

(58) Field of Classification Search
USPC ........... 269/43, 3, 6, 45, 246, 249; 29/255, 29/278, 270
See application file for complete search history.

(56) References Cited

U.S. PATENT DOCUMENTS

| | | | | |
|---|---|---|---|---|
| 3,785,050 | A * | 1/1974 | Whitledge et al. | 30/237 |
| 3,858,298 | A * | 1/1975 | Whitledge et al. | 29/237 |
| 4,827,811 | A | 5/1989 | Vickers | |
| 4,875,266 | A * | 10/1989 | Batten | 29/263 |
| 5,504,982 | A * | 4/1996 | Sharp | 29/255 |
| 6,761,521 | B2 | 7/2004 | McCormack et al. | |
| 8,256,081 | B2 * | 9/2012 | Fridman | 29/255 |
| 2010/0251528 | A1 * | 10/2010 | Hu | 29/252 |
| 2012/0284995 | A1 * | 11/2012 | Andrews | 29/456 |

* cited by examiner

*Primary Examiner* — Lee D Wilson
(74) *Attorney, Agent, or Firm* — Joseph C. Spadacene; Westinghouse Electric Company LLC

(57) ABSTRACT

A press for securing a captive screw assembly within a hole in a panel cover. The press is supported from the panel cover as it is operated and includes a tool for extracting the captive screw assembly from the panel cover hole when the captive screw assembly is no longer functional. The extraction tool engages a bottom end of the captive screw and severs the flare on the ferrule of the captive screw assembly that anchors the assembly to the hole in the panel cover. A captive screw assembly is also described that has a knurled end that anchors the captive screw assembly to a hole in the panel cover.

14 Claims, 6 Drawing Sheets

CAPTIVE SCREW DEVICE AND METHOD

BACKGROUND OF THE INVENTION

1. Field

This invention pertains generally to captive screw assemblies, and more particularly, to the installation and removal of captive screw assemblies applied to a panel cover.

2. Related Art

Captive screws are used to releasably attach panels over an opening or secure a door closed. Captive screws have the advantage that once the screw is disengaged from a threaded hole underlying the panel or door jamb to which the captive screw is attached, there are no loose parts that can get lost or fall into crevices in the equipment protected by the door or panel where the impact of the falling screw may cause damage to sensitive equipment. The captive screw is generally attached to a panel such that the captive screw is in alignment with a hole in the panel. The hole in the panel is aligned with a threaded hole in the structure underlying the panel when the panel is in the closed position. The screw is engaged to the threaded hole to secure the panel in the closed or attached position. The screw is disengaged from the threaded hole to allow the panel to be removed or the door opened.

FIG. 1 illustrates a cross section of a captive screw assembly 10. The captive screw assembly 10 includes a captive screw 12, a sleeve or ferrule 14, and an optional spring 16. As previously mentioned, the captive screw fastener 10 releasably secures a closure member in the closed position. As an example, the captive screw 10 can be used to secure the access panels of electrical equipment over the access openings in, for example, a PSA (Power Switch Assembly) in a nuclear power generation facility. The screw 12 has a screw head 18 and a shaft 20 having a threaded section 22. An annular flange 24 is provided on the shaft 20 intermediate the screw head 18 and the threaded section 22 of the shaft 20. The annular flange 24 or first flange may be spaced apart from the screw head 18 as shown in FIG. 1 or may be secured adjacent the screw head. The ferrule 14 has a hollow bore 26, a panel engaging end 28, and a screw retaining end 30. A portion of the screw shaft 20, including the annular flange 24 is housed within the bore 26 of the ferrule 14 with the annular flange 24 being captured between the ends 28 and 30 of the ferrule 14 by the ferrule internal shoulder 46 in the panel engaging end and the screw retaining end flange 40, respectively. The screw 12 is axially movable relative to the ferrule 14 between an extended position in which the annular flange 24 approaches the panel engaging end 28, and a retracted position in which the annular flange 24 approaches the screw retaining end 30. In addition, the screw 12 can rotate freely relative to the ferrule 14 about the screw's own central longitudinal axis. In the extended position, the threaded portion 22 of the screw shaft 20 projects from the panel engaging end 28 of the ferrule 14 to its maximum amount. The amount of projection of the threaded portion 22 of the screw shaft 20 from the panel engaging end 28 of the ferrule varies as the screw is moved relative to the ferrule. In the retracted position, the amount of projection of the threaded portion 22 of the screw shaft from the panel engaging end 28 of the ferrule is at its minimum. In some embodiments, the threaded portion 22 of the screw shaft may be completely retracted into the bore 26 of the ferrule 14 when the screw 12 is moved to the fully retracted position.

The screw head 18 is typically located outside the ferrule 14 where it can be accessed by a user's fingers for tightening or loosening the screw 12. The screw 12 may be provided with knurling or serrations on the peripheral surface 32 of the screw head 18 to give the user's fingers a better grip. The panel engaging end 28 of the ferrule 14 is designed to engage a hole 34 in the panel 36; the panel 36 being the panel that is to be secured by the captive screw assembly 10, in order to attach the ferrule 14 to the panel 36. The screw retaining end 30 has a hole 38 that allows the shaft 20 of the screw 12 to extend through the hole 38 and into the bore 26, however, the diameter of the hole 38 in the screw retaining end of the ferrule is less than the diameter of the annular flange 24 such that the annular flange 24 remains captured within the bore 26 of the ferrule 14. The screw retaining end 30 of the ferrule may be formed by a second annular flange 40 which projects from the peripheral wall 42 of the ferrule 14 inward toward the central longitudinal axis of the ferrule. The panel engaging end 28 of the ferrule 14 also has a hole 44 that provides clearance for the shaft 20 of the screw but is too small in diameter to allow the annular flange 24 of the screw to clear the opening 44 in the panel engaging end 28 of the ferrule. Peripheral to the hole 44 in the panel engaging end of the ferrule is a shoulder 46 which acts as a seat for one end of the optional spring 16 that may be provided intermediate the flange 24 of the screw and the panel engaging end 28 of the ferrule. This optional spring 16 acts to bias the screw 12 toward the retracted position once the screw is disengaged from the threaded hole (not shown) in the structure underlying the panel 36. The captive screw assembly 10 is attached to a panel 36 such that the screw 12 is in alignment with the hole 34 in the panel 36. The hole 34 in the panel 36 aligns with a threaded hole (not shown) in the structure underlying the panel 36 when the panel 36 is in the closed position. The screw 12 is engaged to the threaded hole to secure the panel 36 in the closed or attached position. The screw 12 is disengaged from the threaded hole to allow the panel 36 to be removed.

In the prior art embodiment illustrated in FIG. 1, the panel engaging end 28 is formed by a portion of the ferrule which has reduced internal and external diameters. This reduced diameter portion is then flared outward giving the panel engaging end 28 a U-shaped cross section with the concave side of the "U" shape facing outward away from the central longitudinal axis of the ferrule. The reduced diameter portion of the panel engaging end 28 also forms an exterior shoulder 48 which abuts the surface of the panel 36 once the captive screw assembly 10 is mounted to the panel 36. The ferrule 14 can be pressed in or crimped to the hole 34 such that the surface 50, which surrounds the bottom rim 52 of the panel engaging end 28, is pressed against the sidewall of the hole 34 to thereby press fit the ferrule 14 to the panel 36. The panel engaging end 28 may be made in a variety of different configurations such as the press-in type depicted in FIG. 1, the snap-in type, the threaded type, the swaged type, etc.

It is sometimes difficult to assure that the captive screw assemblies are securely attached to the panel cover to avoid the captive screw assemblies from being dislodged and possibly dropping into sensitive instrumentation within the cabinets, potentially damaging the instrumentation.

According, means are desired that can adequately secure the captive screw assemblies to assure they will not be readily dislodged. Furthermore, such a means is desired that will produce a consistent result.

Additionally, a means is desired that will disengage such captive screw assemblies that have been securely attached if they become damaged or otherwise are unable to fulfill their intended function.

Further, a new captive screw assembly is desired that will enhance the attachment coupling between the screw assembly and the panel cover.

SUMMARY OF THE INVENTION

These and other objects are achieved by the embodiments described herein which provide a captive screw press and related equipment for operating on a captive screw assembly in relation to an opening in a panel cover. The captive screw press includes a base having an upper surface with a front portion and a rear portion. The captive screw press also includes a platform having an underside with a front portion and a rear portion. The rear portion of the platform is attached to the base and affixed to the rear portion of the base with one or both of either the rear portion of the upper surface of the base and/or the rear portion of the underside of the platform extending towards the other so that the front portion of the base is spaced from the front portion of the platform. A clamp is attached to either the front portion of the upper surface of the base or the front portion of the underside of the platform. The clamp is movable to extend toward the other of the front portion of the base or the front portion or the underside of the platform so as to clamp the panel cover therebetween. A hole in the top of the platform extends along an axis through the platform into the space between the underside of the front portion of the platform and the upper surface of the front portion of the base. A force arm is coaxially movable within the hole to place a force on the captive screw assembly when placed in the hole, with at least one of either the force arm or the captive screw assembly being rotatable when it moves in the hole. The captive screw press also has a thrust bearing attached to an underside of the force arm between the captive screw assembly and the force arm when the force arm places the force on the captive screw assembly to drive the captive screw assembly in the direction of the panel.

In one embodiment, the sidewalls of the hole includes bearings to hold the captive screw assembly within the hole prior to the force arm applying a downward pressure on the captive screw assembly. Preferably, the bearings are spring biased towards the axis of the hole. In still another embodiment, the clamp includes an insert in either the upper surface of the base or the underside of the platform, which extends into or withdraws from the space between the base and platform in response to the operation of a set screw.

Preferably, the platform and the base are constructed from metal including a co-polymer lining on at least a portion of the upper surface of the base and at least a portion of the underside of the platform. In one of the embodiments, the force arm is preferably a threaded screw. Desirably, a raised columnar structure extends upward from the upper surface of the platform and has a central opening that extends axially through the columnar structure and mates coaxially with the hole, with the central opening in the columnar structure being at least partially threaded with a thread pitch that matches the threaded screw.

In still another embodiment, the captive screw press includes an opening in the base that extends from an underside of the base through the upper surface of the base coaxial with the hole in the platform. Preferably, the base is separable from the platform.

In operation, a captive screw assembly is disposed within the hole in the platform below the force arm and has a ferrule with a central bore capturing a captive screw. The ferrule has an upper section opposed to the thrust bearing on the force arm and a lower section with a reduced diameter sized to be pressed within the opening in the panel cover. Preferably, the lower section has a knurl over at least a portion of its peripheral surface, that causes the knurl to bite into a wall of the opening in the panel cover and turn the ferrule during insertion of the captive screw assembly into the opening in the panel cover. Desirably, the lower section of the ferrule extends in the axial direction a distance sufficient to substantially fully insert the reduced diameter portion of the lower section of the ferrule with the bottom of the ferrule recessed in the underside of the panel. Furthermore, a flaring tool is also provided for flaring the portion of the lower section of the ferrule so that the knurled end is locked against the sidewall of the hole in the panel cover. Desirably, the captive screw press also includes an extraction tool for removing the flared lower edge on the captive screw assembly from the underside of the panel. The extraction tool includes an elongated shaft having a female threaded recessed end at one end that matches the thread on the captive screw and an impact face at the other end. The one end having the female threaded recess, has a beveled outer surface that flares outward, away from the female threaded recess towards the other end. The female threaded recess has a cutting edge substantially surrounding its distal end for cutting through the flared lower portion of the ferrule.

The embodiments described herein also include a method of fastening a captive screw assembly to a panel. The method includes the step of placing a captive screw press over a surface of the panel and centering an opening in the captive screw press for holding the captive screw, over a hole in the panel into which the captive screw assembly is to be pressed, using a centering tool that is inserted through the bottom of the captive screw press into the hole in the panel. The steps of the method further include clamping the captive screw press to the panel and tightening a force arm through the opening to press the captive screw assembly into the hole in the panel. The method then includes the step of loosening the clamp that clamps the captive screw press to the panel to remove the captive screw press from the panel.

In a preferred embodiment, the captive screw press has an upper and lower portion and the step of loosening the clamp to remove the captive screw press from the panel includes the step of separating the upper and lower portion of the captive screw press. Furthermore, the method may include the step of rotating the force arm as it is tightened.

The embodiments described herein also contemplate a captive screw assembly to be pressed into an opening in the panel cover for securing the panel cover to the panel housing. The captive screw assembly includes a ferrule with a central bore, with the ferrule having an upper section and a lower section. The upper section has a first diameter and the lower section has a second diameter which is smaller than the first diameter and sized to be pressed within the opening the panel cover. The lower section has a knurl over at least a portion of its peripheral surface that causes the knurl to bite into a wall of the opening in the panel cover as the lower section is pressed into the opening and causes the ferrule to turn during insertion of the captive screw assembly into the opening in the panel cover. The captive screw assembly also includes a captive screw which is captured substantially within the central bore of the ferrule.

The embodiments described herein further contemplate an extraction tool for removing the flare on a captive screw assembly from the underside of a panel. The extraction tool includes an elongated shaft having a first and second end. A female threaded recess is provided at one end with the pitch on the thread on the recess matching the pitch on the thread on the captive screw. The first end with the threaded recess also has a beveled outer surface that flares outwardly, away from the female threaded recess towards the second end. An impact face is configured at the second end. Preferably, the beveled outer surface in the first end terminates in a cutting edge and the diameter of the portion of the elongated shaft adjacent the first end between the beveled outer surface and the second end has a diameter smaller than the second end.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
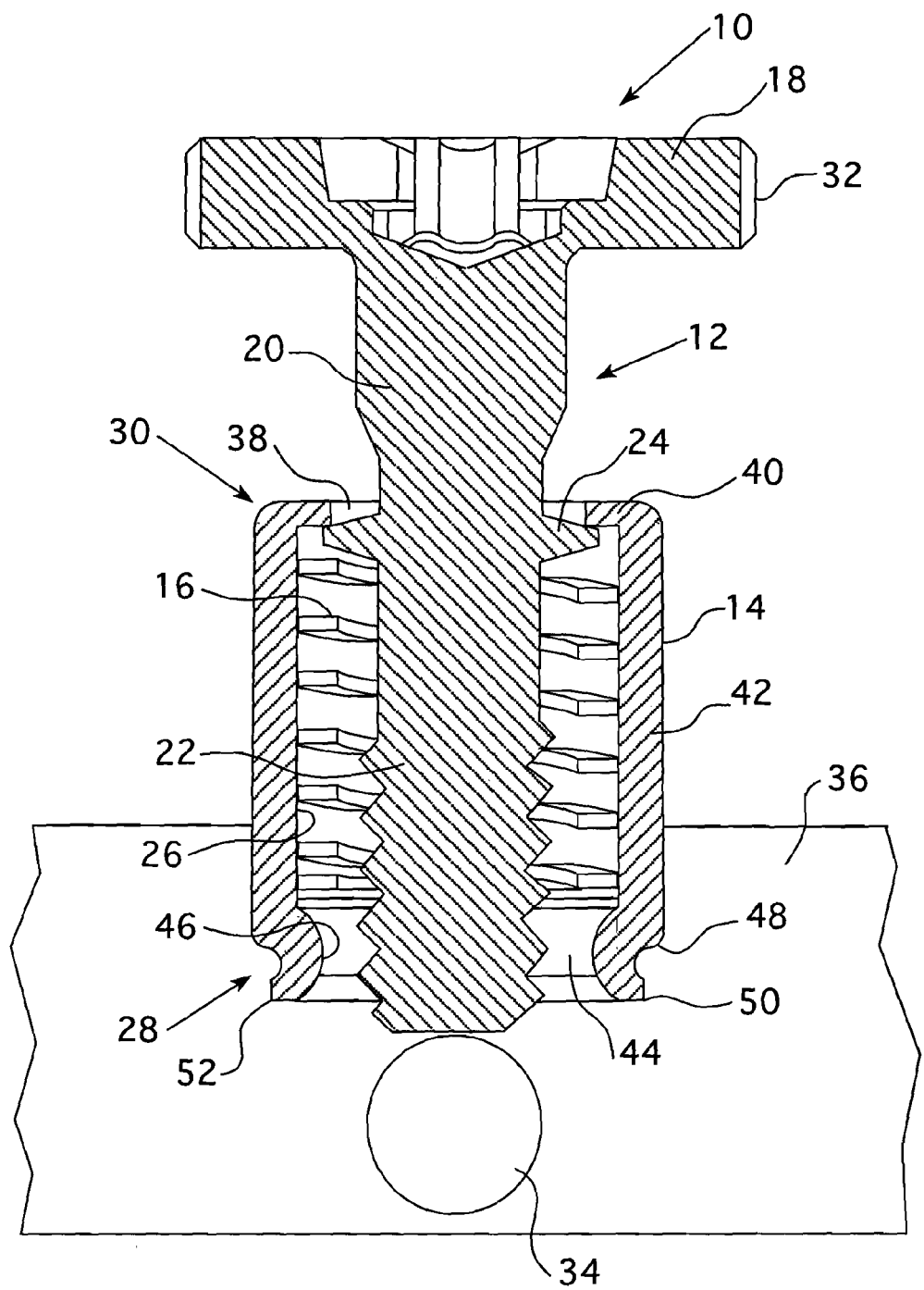
FIG. 1 is a cross sectional view of a prior art captive screw assembly positioned above a hole in a panel.
Figure 2:
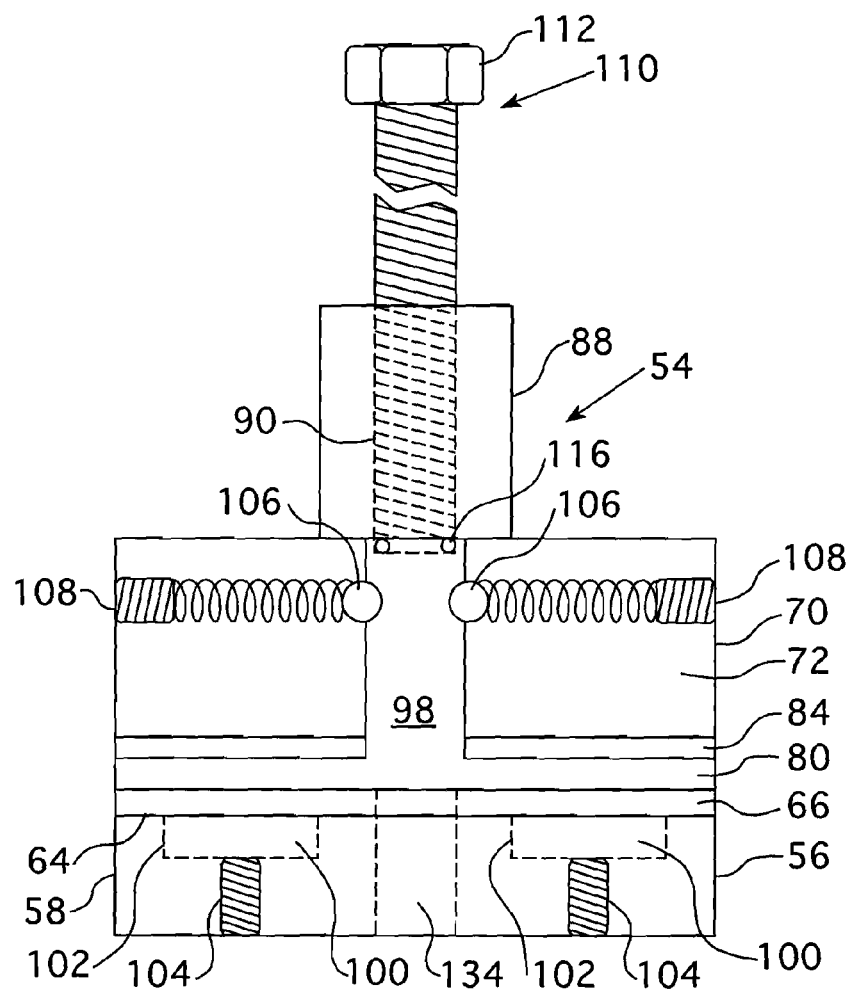
FIG. 2 is a schematic view of the captive screw press of this embodiment.
Figure 3:
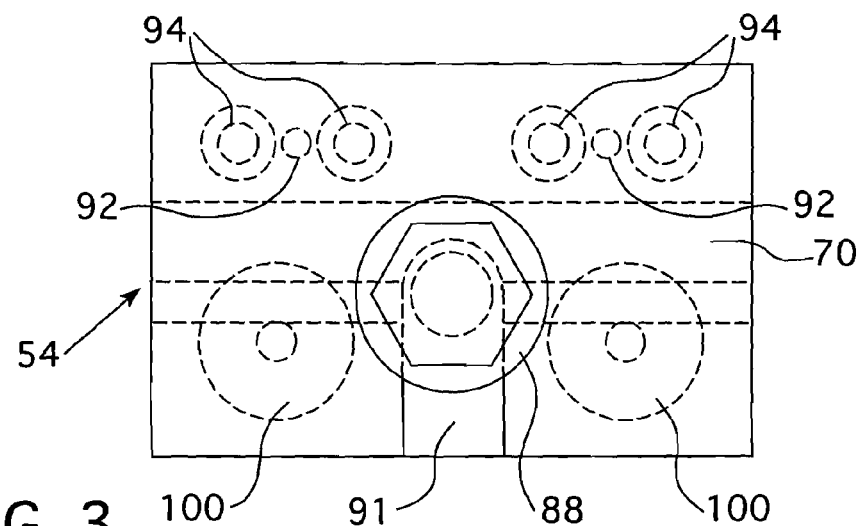
FIG. 3 is a schematic view of the captive screw press of this invention with a number of the internal features shown in phantom.
Figure 4:
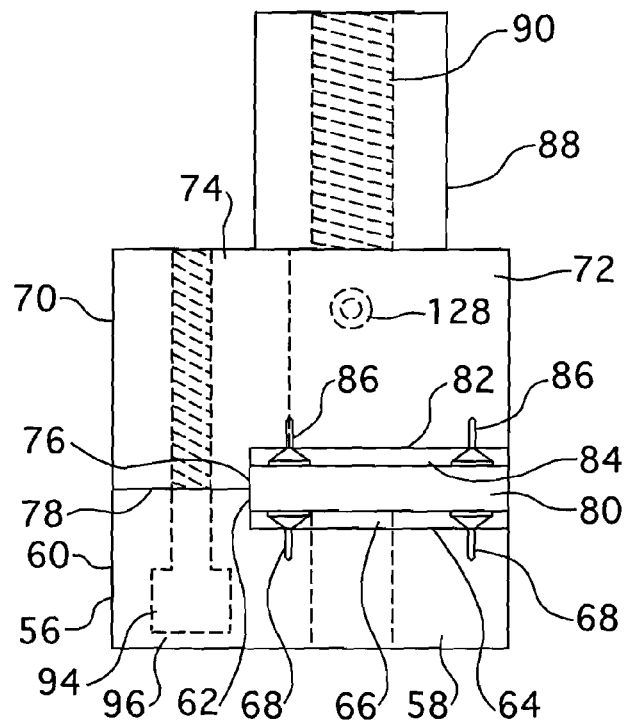
FIG. 4 is a schematic view of the captive screw press of this embodiment with a number of the internal features shown in phantom.
Figure 7:
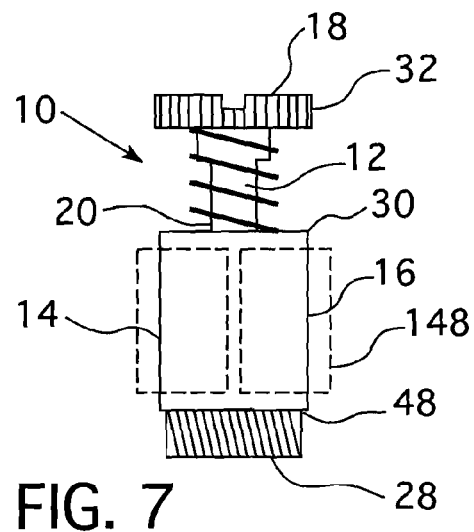
FIG. 7 is a perspective view of the captive screw of this embodiment.
Figure 8:
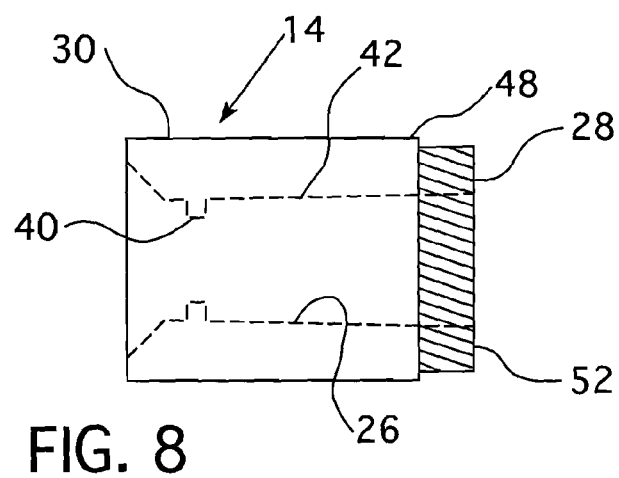
FIG. 8 is a schematic view of the ferrule of the captive screw shown in FIG. 7 with the internal bore illustrated in phantom.
Figure 10:
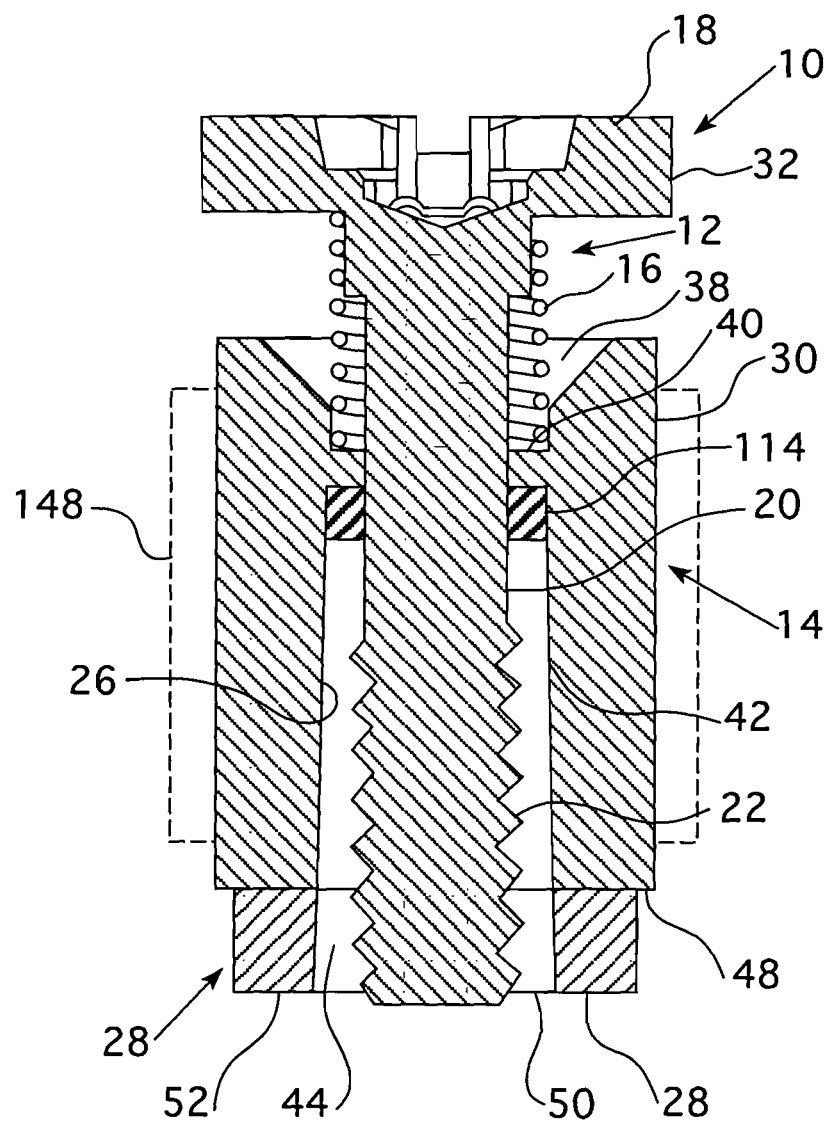
FIG. 10 is a cross sectional view of a captive screw assembly in accordance with this invention.

The captive screw press of this embodiment is employed to fasten a captive screw assembly to a panel cover in a convenient and secure manner. A schematic view, partially in section, of the captive screw press 54 is shown in FIGS. 2, 3 and 4, and includes three main parts. The lower half or base 56 is the first main part and is preferably constructed from a metal such as 303 stainless steel. The base 56 has a front section 58 and a rear section 60 which interface at a step 62. The upper surface 64 of the front section 58 of the base 56 is preferably lined with a thermoplastic polymer 66, such as Delrin®, which in this embodiment is fastened to the base with the screws 68. The upper working half or platform 70 of the captive screw press 54 is the second main part and is preferably made of a metal such as heat treated 17-4 stainless steel. The platform 70 has a front section 72 and a rear section 74 with a portion of the rear section 74 extending below the front section 72 and mating with an upper surface of the rear section 60 of the base 56 at the interface 78 to form a space 80 between the undersurface of the front section 72 of the platform 70 and the upper surface of the front section 58 of the base 56. Alternatively, the rear section 60 of the base 56 can be raised or both the sections 56 and 74 can be raised to form the space 80. The lower surface 82 of the front section 72 of the platform 70 similarly has a thermoplastic polymer liner that is secured in place by the screws 86. The rear sections 60 and 74 are aligned with one another by the dowels 92 and fastened together by the bolts 94 which can be seen in FIGS. 3 and 4. The bolts 94 are countersunk in the recesses 96. As can be seen in FIGS. 2, 3 and 4, the platform 70 also includes a columnar structure 88 that rises above an upper surface of the platform 70 and has a threaded central bore 90 which extends into and is coaxial with an opening 98 through the platform, which extends from the threaded central bore 90 to the space 80 between the front sections 58 and 72, respectively of the base 56 and platform 70. The opening 98 is sized to accommodate a captive screw assembly 10, such as previously described with regard to FIG. 1 or as shown in FIGS. 7, 8 and 10. A slot 91 in the front of the platform 70 communicates with the central opening 98 and is sized to facilitate placement of the captive screw assembly 10 into the opening 98.

The space 80 between the front sections 72 and 58, respectively of the platform 70 and base 56 is sized to accommodate the width of the panel cover which is to be clamped between the front sections 58 and 72. The liners 66 and 84 are provided to prevent damage to the panel cover as the cover is clamped therebetween. Discs 100 are slidably mounted in recesses 102 in the upper surface 64 of the front section 58 of the base 60 and are raised or lowered by set screws 104 to apply the desired clamping force. Alternatively, the discs can extend from the undersurface of the front section 72 of the platform 70. Additionally, spring biased ball bearings 106 extend slightly from the walls of the opening 98 and are retained in position by the set screws 108. The ball bearings hold the captive screw assembly 10 in position within the opening 98 until it is forced through the opening 98 into a hole 34 that is provided in the panel cover. The columnar structure 88 can be supported in a recess machined in the top of the platform 70 over the opening 98 and secured in place with the set screw 128 shown in FIG. 4. Such a configuration would enable the columnar structure to be removed for easy insertion of the captive screw assembly into the opening 98 if a slot 91 is not provided for that purpose. Alternately, the columnar structure 88 can be formed as an integral part of the remainder of the platform 70 or the columnar structure can be welded to the top of the platform 70. In the latter two cases, the captive screw assembly can be loaded into the opening 98 by separating the platform from the base if a slot 91 is not provided. The slot 91 is the most convenient and efficient alternative.

Figure 5:
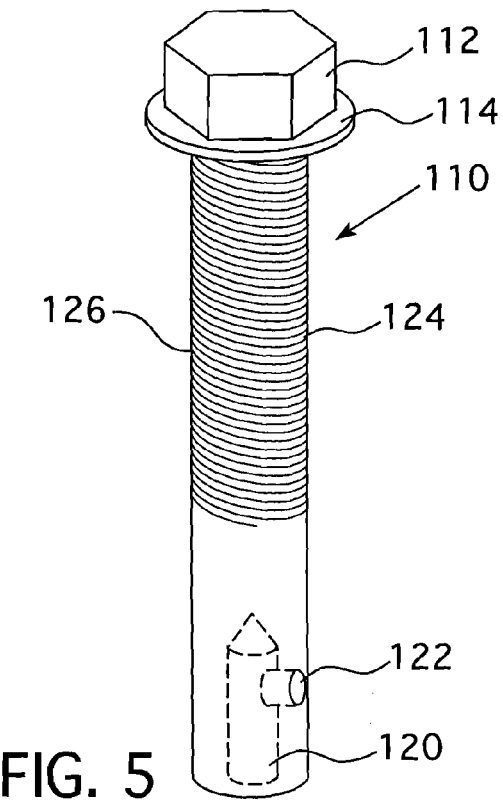
FIG. 5 is a perspective view of the drive screw of the captive screw press shown in FIG. 2.
Figure 6:
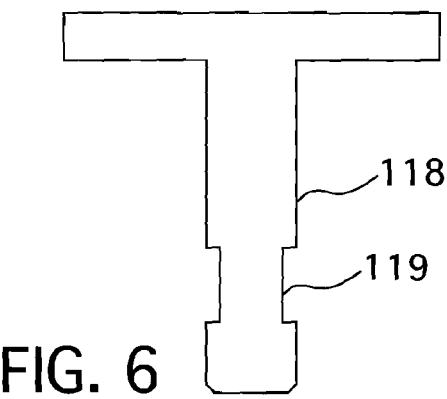
FIG. 6 is a side view of the thrust bearing retaining pin that is inserted at the end of the drive screw shown in FIG. 5 and employed for securing the thrust bearing at the end of the drive screw.

The third main component of the captive screw press is the drive bolt 110 shown in FIGS. 2 and 5. In this embodiment, the drive bolt 110 is a ½-20, 3 inches (7.62 cm) long with a ¾ inch (1.91 cm) hex head 112. FIG. 5 shows the drive bolt 110 with an optional integral flange or washer 114. On the lower end of the drive bolt 110 shown in FIG. 2, there is a thrust bearing 116 that is free to turn independent of the rotation of the drive bolt 110 or the head of the captive screw, to prevent damage to the head of the captive screw. The thrust bearing 116 is rotatably secured to the bottom of the drive bolt 110 by shaft pin 118 (also known as a "top hat"), which passes through the axis of rotation of the thrust bearing and into a recess 120 in the lower end of the drive bolt 110 and is secured in place by a 4-40 set screw 122. The set screw 122 extends into an annular recess 119 in the shaft pin 118 and loosely retains the shaft pin so it can rotate with the thrust bearing 116. The drive bolt 110 has a thread 124 which extends at least partially along the upper shaft 126 of the drive bolt 110 and matches the pitch on the thread in the internal bore 90 of the columnar structure 88. When pressure is applied to the captive screw assembly by the drive bolt 110, the thrust bearing 116 will rotate with the screw head of the captive screw and drive it downward into the panel cover as the drive bolt 110 is rotated in a direction that will move it towards the panel cover clamped in the space 80 between the lower surface 82 of the front portion 72 of the platform 70 and the upper surface 64 of the front portion 58 of the base 56.

The press 54 can be used with either stainless steel or aluminum captive screws, or even captive screws made out of a variety of other materials. The press 54 can be applied to the edge of the panel and located on a center line of the hole in the panel in which it is to be inserted, employing a locator such as the extraction tool 130 shown in FIG. 9. The reduced diameter end 132 of the extraction tool 130 is inserted through a hole 134 in the base 56 and through the hole in the panel to align the hole in the panel with the center line of the opening 98 in the platform front section 72. Once located on the center line the two set screws 104, shown in FIG. 2, on the bottom half of the press 54 can be tightened which drives the discs 100 against the Delrin® liner 66 and clamps the press securely to the front panel. Once the press is secure, the locator 130 can be removed and the captive screw assembly can be inserted into the opening 98 of the press 54 and pressure can be applied by the drive bolt 110, driving the captive screw assembly into the panel and snugging it into place. If the ferrule is made of a relatively soft metal, e.g., aluminum, a flaring tool such as the one described in U.S. Pat. No. 6,761,521, can be applied through the hole 134 in the base to flare the bottom of the ferrule outwardly against the underside of the panel cover, which will secure the ferrule of the captive screw assembly to the panel cover. The flare is particularly effective if the underside of the hole 34 in the panel 36 has a chamfer.

This embodiment also contemplates an improved captive screw assembly 10 shown in FIGS. 7 and 10, with the ferrule shown in more detail in FIG. 8. Like reference characters to that employed in FIG. 1 are used in FIGS. 7, 8 and 10 to identify corresponding components. Withdrawal of the captive screw from the ferrule is prevented by a flange or washer 114 on the screw shaft 20 abutting the radially inward protecting flange 40 on the wall of the ferrule bore 26 and the screw head 18 interface with the top of the ferrule 14. A major improvement is the use of angled knurls on the peripheral surface of the reduced outside diameter lower portion 52 of the ferrule 14. The angled knurls cause the captive screw assembly to rotate when pressed by the drive screw 110 into the opening 34 in the panel cover 36. The captive screw assembly rotates in the direction of the knurl with a screw affect, cutting into the wall of the panel hole 34, which will secure itself in the hole. The captive screw assembly is preferably made of stainless steel, and desirably heat treated 17-4 stainless steel and employs a Delrin® washer 114 which when pressed in place holds a ¼-20 spring and screw in place within the screw retaining end 30 of the ferrule 14. As can be appreciated from FIG. 10, the Delrin® washer 114 is assembled by being pressed in from the bottom side of the tapered bore 26. The washer inside diameter is approximately 0.005 inch (0.013 cm) smaller than the major diameter of the thread 22, which makes it easy to screw through the washer.

The press 54 may be used with different sizes of captive screw assemblies 10 by using split sleeves 148 of different widths, that fit over the ferrule 14 as shown in phantom in FIGS. 7 and 10. The split sleeves 148 may also be made out of the Delrin® polymer and is designed to substantially fill any gap between the outside diameter of the ferrule 14 and the inside diameter of the opening 98.

Figure 9:
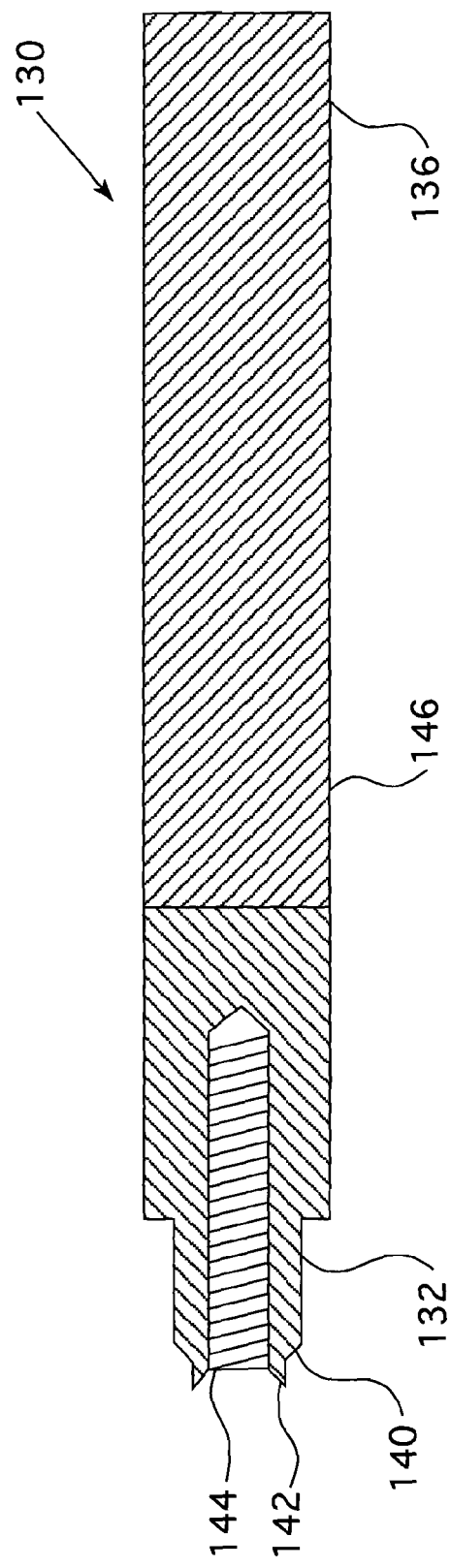
FIG. 9 is a cross-sectional view of the extraction tool of this embodiment shown partially in cross section.

The embodiments described herein also contemplate an extraction tool for removing the captive screw assembly from the panel cover. The extraction tool 130 is illustrated in FIG. 9 and is preferably made from heat treated 17-4 stainless steel. The extraction tool 130 has an elongated shaft 146 with a knurled end 136 and a reduced diameter section 132 at the other distal end. The reduced diameter section 132 terminates at its distal end with a beveled section 140 that at its tip has a cutting edge 142 that surrounds a threaded recess 144. The pitch of the threads in the recess 144 match the pitch of the threads on the captive screw assembly. The extraction tool 130 can be screwed onto the captive screw from the rear side of the panel. The cutting edge 142 centers the tool in the flared part of the captive screw assembly. The beveled section 140 limits the extent of the cut. Once the tool is centered, the tool is rotated in a clockwise direction as tight as the operator can manage by hand. At that point, a hammer can be applied to the backside of the tool at the end of the knurled end 136. One or two hits with the hammer are usually all that is required to sever the flared part of the captive screw 12. Once that has been done, the tool can be unscrewed from the captive screw and the captive screw assembly can be pulled from the panel hole from the front side of the panel.

While specific embodiments of the invention have been described in detail, it will be appreciated by those skilled in the art that various modifications and alternatives to those details could be developed in light of the overall teachings of the disclosure. For example, an alternate force arm can be substituted for the drive bolt. Furthermore, the dimensions and materials described herein are meant to be illustrative only, and alternatives can readily be accommodated. Accordingly, the particular embodiments disclosed are meant to be illustrative only and not limiting as to the scope of the invention which is to be given the full breadth of the appended claims and any and all equivalents thereof.

What is claimed is:

1. A captive screw press for operating on a captive screw assembly in relation to an opening in a panel cover, comprising:
   a base having an upper surface with a front portion and a rear portion;
   a platform having an underside with a front portion and a rear portion, with the rear portion of the platform attached to the base and affixed to the rear portion of the base with one or both of either the rear portion of the upper surface of the base or the rear portion of the underside of the platform extending towards the other of the rear portion of the upper surface of the base or the rear portion of the underside of the platform so that the front portion of the base is spaced from the front portion of the platform;
   a clamp attached to either the upper surface of the front portion of the base or the underside of the front portion of the platform and moveable to extend towards another of the upper surface of the front portion of the base or the underside of the front portion of the platform so as to clamp the panel cover therebetween;
   a hole in a top of the platform, the hole extending along an axis through the platform into the space between the underside in the front portion of the platform and the upper surface of the front portion of the base, the hole having a side wall including at least one bearing in the side wall configured to support the captive screw assembly when the captive screw assembly is inserted in the hole;
   a force arm substantially coaxially moveable within the hole to place a force on the captive screw assembly when placed in the hole, with at least one of either the force arm or the captive screw assembly being rotatable when the at least one of either the force arm or the captive screw moves; and
   a thrust bearing attached to an underside of the force arm between the captive screw assembly and the force arm when the force arm places the force on the captive screw assembly.

2. The captive screw press of claim 1 wherein the sidewall of the hole includes a plurality of bearings in the side wall to support the captive screw assembly in the hole when the force arm is not applying the force on the captive screw assembly.

3. The captive screw press of claim 2 wherein the bearing is spring biased toward the axis.

4. The captive screw press of claim 1 wherein the clamp comprises an insert in either the upper surface of the base or the underside of the platform, which extends into or withdraws from the space between the base and platform in response to the operation of a set screw.

5. The captive screw press of claim 1 wherein the platform and the base are constructed from metal including a copolymer lining on at least a portion of the upper surface of the base and at least a portion of the underside of the platform.

6. The captive screw press of claim 1 wherein the force arm is a threaded screw.

7. The captive screw press of claim 6 including a columnar structure that extends upward from an upper surface of the platform and has a central opening that extends axially through the columnar structure mating coaxially with the hole, the central opening being at least partially threaded with a thread pitch that matches the threaded screw.

8. The captive screw press of claim 1 including an opening in the base that extends from an underside of the base through the upper surface of the base coaxial with the hole in the platform.

9. The captive screw press of claim 1 including an opening in a front of the front portion of the platform, with the opening in the front portion of the platform extending into the hole and sized to permit placement of the captive screw assembly into the hole through the opening.

10. The captive screw press of claim 1 wherein the base is separable from the platform.

11. The captive screw press of claim 1 including the captive screw assembly disposed within the hole below the force arm, the captive screw assembly having a ferrule with a central bore capturing a captive screw, the ferrule having an upper section opposed to the thrust bearing and a lower section with a reduced diameter sized to be pressed within the opening in the panel cover, the lower section having a knurl over at least a portion of its peripheral surface that causes the knurl to bite into a wall of the opening in the panel cover and turn during insertion of the captive screw assembly into the opening in the panel cover.

12. The captive screw press of claim 11 wherein the lower section of the ferrule extends in the axial direction a distance to fully insert the reduced diameter lower section of the ferrule with a bottom of the ferrule recessed in an underside of the panel including a flaring tool for flaring a portion of the lower section of the ferrule.

13. The captive screw press of claim 12 including an extraction tool for removing the flare on the captive screw assembly from the underside of the panel, the extraction tool comprising an elongated shaft having a female threaded recessed end at one end that matches the thread on the captive screw and an impact face at another end, the one end having a beveled outer surface that slants from the female threaded recess towards the another end.

14. The captive screw press of claim 1 including a sleeve for substantially surrounding a portion of the captive screw assembly that faces a wall of the hole when the captive screw assembly is placed in the hole, with a thickness of the sleeve substantially filling a gap between an outside diameter of the captive screw assembly and an inside diameter of the hole.

* * * * *